(12) United States Patent
Kim et al.

(10) Patent No.: US 9,231,689 B2
(45) Date of Patent: Jan. 5, 2016

(54) APPARATUS FOR REGULATING TRANSMISSION POWER OF REPEATER IN LONG TERM EVOLUTION SYSTEM

(71) Applicant: SOLID TECHNOLOGIES INC., Seongnam-si (KR)

(72) Inventors: Hyun-Chae Kim, Seoul (KR); Cheong-Hwan Kim, Seoul (KR); Joong-Hyup Lee, Seongnam-si (KR)

(73) Assignee: Solid Technologies Inc., Gyeonggi-Do (KR)

( * ) Notice: Subject to any disclaimer, the term of this patent is extended or adjusted under 35 U.S.C. 154(b) by 0 days.

(21) Appl. No.: 14/362,391

(22) PCT Filed: Nov. 30, 2012

(86) PCT No.: PCT/KR2012/010272
§ 371 (c)(1),
(2) Date: Jun. 2, 2014

(87) PCT Pub. No.: WO2013/081403
PCT Pub. Date: Jun. 6, 2013

(65) Prior Publication Data
US 2014/0335779 A1 Nov. 13, 2014

(30) Foreign Application Priority Data

Dec. 1, 2011 (KR) .......................... 10-2011-0127594

(51) Int. Cl.
*H04B 7/155* (2006.01)
*H04W 52/52* (2009.01)
(Continued)

(52) U.S. Cl.
CPC ......... *H04B 7/15535* (2013.01); *H04W 52/143* (2013.01); *H04W 52/245* (2013.01); *H04W 52/246* (2013.01); *H04W 52/46* (2013.01); *H04W 52/52* (2013.01); *H04L 5/0007* (2013.01)

(58) Field of Classification Search
CPC .................................................. H04W 52/146
USPC ......................................... 455/7, 10, 11.1, 69
See application file for complete search history.

(56) References Cited

U.S. PATENT DOCUMENTS 5,583,648 A * 12/1996 Ichinoi et al. ................. 386/335
8,521,081 B2 * 8/2013 Kang et al. ...................... 455/10
(Continued)

FOREIGN PATENT DOCUMENTS

EP       2 323 299     5/2011
JP       2007-28511    2/2007
(Continued)

OTHER PUBLICATIONS

International Search Report for PCT/KR2012/010272 mailed on Mar. 29, 2013 and its translation thereof.
(Continued)

*Primary Examiner* — Tuan H Nguyen
(74) *Attorney, Agent, or Firm* — Ladas & Parry, LLP

(57) ABSTRACT

The present invention relates to an apparatus capable of flexibly regulating coverage of a repeater in a long term evolution system (hereinafter referred to as an LTE system). The present invention provides an apparatus for regulating transmission power of a repeater in an LTE (LONG TERM EVOLUTION) system, the apparatus including a sink signal detector that detects a sink signal of a reception signal received through an IF/RF receiver of the repeater, a sink signal power measurer that measures a size of power of the sink signal detected through the sink signal detector, and an amplification controller that calculates a gain of an amplifier of the repeater for maintaining coverage of the repeater based on the size of the power of the sink signal measured through the sink signal power measurer, and controls the amplifier of the repeater according to the calculated gain. In the present invention, in a wired or wireless repeater, it is possible to efficiently regulate the coverage of the repeater and to implement the apparatus with low complexity in the LTE system. Further, the present invention is flexibly applicable to an LTE system supporting a scalable bandwidth and it is possible to effectively regulate the coverage of multiple LTE signals using signal amplification for multiple LTE signals.

7 Claims, 8 Drawing Sheets

(51) Int. Cl.
*H04W 52/24* (2009.01)
*H04W 52/14* (2009.01)
*H04W 52/46* (2009.01)
*H04L 5/00* (2006.01)

(56) References Cited

U.S. PATENT DOCUMENTS

2011/0151775 A1   6/2011   Kang et al.
2012/0113834 A1*  5/2012   Hunzinger ............... 370/252

FOREIGN PATENT DOCUMENTS

| JP | 2011-71645 | 4/2011 |
| KR | 10-2006-0084761 A | 7/2006 |
| KR | 10-2009-0063853 A | 6/2009 |
| KR | 10-2011-0054029 A | 5/2011 |
| KR | 10-2011-0071838 A | 6/2011 |
| WO | 2010/024314 | 3/2010 |
| WO | 2011/146647 | 11/2011 |

OTHER PUBLICATIONS

Office Action dated Jun. 2, 2015 for Japanese Patent Application No. 2014-544669 and its English summary provided by Applicant's foreign counsel.

Extended European Search Report issued on Jun. 3, 2015 for European Patent Appl. No. 12854057.2.

* cited by examiner

APPARATUS FOR REGULATING TRANSMISSION POWER OF REPEATER IN LONG TERM EVOLUTION SYSTEM

CROSS-REFERENCE TO RELATED APPLICATIONS

This application is the U.S. National Stage of International Patent Application No. PCT/KR2012/010272 filed on Nov. 30, 2012, which claims priority to Korean Patent Application No. 10-2011-0127594 filed on Dec. 1, 2011, the disclosures of which are hereby incorporated by reference in their entireties.

TECHNICAL FIELD

The present invention relates to an apparatus capable of flexibly regulating coverage of a repeater in a long term evolution system (hereinafter referred to as an LTE system).

BACKGROUND ART

In a mobile communication system, a wired or wireless repeater is used to extend coverage of a base station. Further, intensity of a signal received from the base station to the repeater may vary over time. In other words, the intensity of the signal received from the base station to the repeater may vary according to the number of serviced communication terminals, an amount of transmitted traffic, or channel fading. Also, in general, the repeater generally transfers constant transmission power regardless of the intensity of the signal received from the base station. FIG. 1 illustrates a general mobile communication system including a base station, a repeater, and a terminal.

The repeater has a constant range in which communication is possible, which is called coverage. From the viewpoint of cell planning, it is a very important matter to maintain constant coverage of the repeater. In other words, there are problems in that communication quality is degraded due to interference between adjacent coverage when the coverage of the repeater becomes wide, and an area in which service is impossible is generated when the coverage becomes narrow. The coverage of the repeater may be changed in a predetermined range (between coverage 1 and coverage 2), as illustrated in FIG. 2. FIG. 2 is a schematic diagram illustrating a change in the coverage of the repeater.

Further, the coverage is actually determined based on intensity of a specific signal (e.g., a pilot signal) rather than total signal intensity. Therefore, there is a problem in that the constant coverage of the repeater cannot be maintained even when the repeater maintains constant transmission power.

In other words, a scheme for maintaining the constant coverage of the repeater is required for such a reason.

A conventional technology proposed to solve such a problem (Korean Patent Laid-open Publication No. 10-2006-0084761) is characterized in that coverage of a repeater is regulated through tracking of a pilot signal. However, there is a problem in that this conventional technology is restrictively applied to only a CDMA signal. In other words, the pilot signal is divided as a code in the CDMA signal, and it is not problematic to detect intensity of the pilot signal in the repeater.

However, in an orthogonal frequency division multiplexing (OFDM) technology, that is, an orthogonal frequency division multiplexing system, pilots are scattered on time/frequency and thus high complexity is required to detect a pilot signal. FIG. 3 is a graph illustrating a pilot structure in an OFDM system. In the graph illustrated in FIG. 3, a horizontal axis indicates time, a vertical axis indicates a frequency, and RO indicates the pilot signal.

In other words, in the case of LTE that is an OFDM-based system, a position in a frequency domain of a reference signal serving as the pilot signal is changed according to a subframe number and a base station ID unlike a conventional technology. Accordingly, an additional apparatus for searching for the position of the pilot (reference) is required.

DISCLOSURE

Technical Problem

According to one aspect of the present invention, an apparatus capable of flexibly regulating coverage of a repeater in a long term evolution system (hereinafter referred to as an LTE system) is provided.

Technical Solution

An apparatus for regulating transmission power of a repeater in an LTE (LONG TERM EVOLUTION) system according to an embodiment of the present invention is an apparatus for regulating transmission power of a repeater in an LTE system, the apparatus including: a sink signal detector that detects a sink signal of a reception signal received through an IF/RF (Intermediate Frequency/Radio Frequency) receiver of the repeater; a sink signal power measurer that measures a size of power of the sink signal detected through the sink signal detector; and an amplification controller that calculates a gain of an amplifier of the repeater for maintaining coverage of the repeater based on the size of the power of the sink signal measured through the sink signal power measurer, and controls the amplifier of the repeater according to the calculated gain.

Further, the repeater is provided to be electrically connected to the sink signal detector, the sink signal power measurer, the amplification controller, and the amplifier, and the sink signal detector detects the sink signal by causing the reception signal received through the IF/RF receiver to pass through a low pass filter (LPF) having a bandwidth of the sink signal and estimating a timing of the sink signal from the passing signal.

Further, the repeater is provided to be electrically connected to the sink signal detector, the sink signal power measurer, the amplification controller, and the amplifier, and the sink signal detector detects the sink signal through timing estimation of a primary synchronization signal (PSS) or a secondary synchronization signal (SSS) included in the sink signal.

Further, the repeater is provided to be electrically connected to the sink signal detector, the sink signal power measurer, the amplification controller, and the amplifier, and the PSS or the SSS of the sink signal detector repeatedly appears every predetermined time in one frame of an LTE signal that is the reception signal.

Further, the repeater is provided to be electrically connected to the sink signal detector, the sink signal power measurer, the amplification controller, and the amplifier, and the sink signal power measurer obtains average power of a timing part of the sink signal passing through the low pass filter (LPF) and calculates a size of the obtained average power as the size of the power of the sink signal.

Further, the amplification controller regulates the gain of the amplifier based on the calculated power size (average power) of the sink signal and a predetermined target power determining the coverage of the repeater.

Further, the reception signal received by the sink signal detector is a signal obtained by converting the reception signal received through the IF/RF receiver of the repeater to a digital signal.

Further, the LTE signal includes one or more signals, the sink signal detector receives all of respective signals of one or more IF/RF receivers of the repeater included to receive the one or more LTE signals, and the amplification controller controls respective amplifiers included to correspond to the number of the LTE signals.

Advantageous Effects

According to one aspect of the present invention, it is possible to efficiently regulate the coverage of the repeater in a wired or wireless repeater.

Further, it is possible to implement the apparatus with lower complexity in the LTE system in comparison with a conventional technology.

Further, the apparatus is flexibly applicable to an LTE system that supports a scalable bandwidth.

Furthermore, it is possible to effectively regulate the coverage of multiple LTE signals using the signal amplification for the multiple LTE signals.

MODE FOR INVENTION

Hereinafter, embodiments of the present invention will be described in detail with reference to the accompanying drawings.

First, since an apparatus for regulating transmission power of a repeater according to one embodiment of the present invention is applied to an LTE system, the LTE system will be described hereinafter with reference to FIG. 4.

Figure 1:
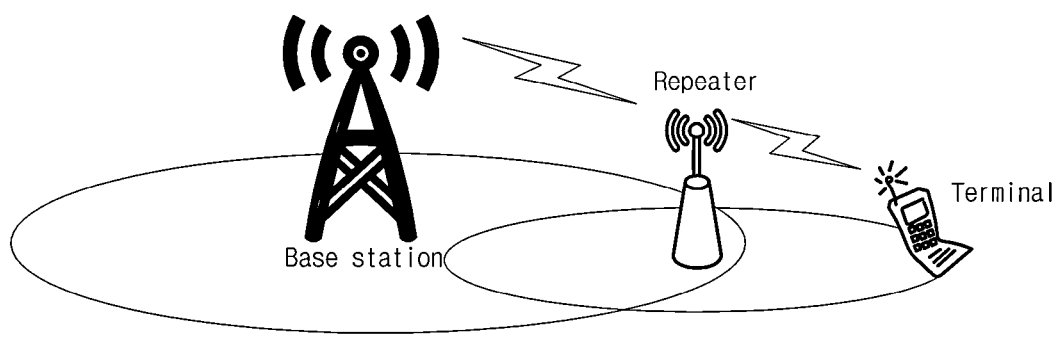
FIG. 1 is a schematic diagram illustrating a general mobile communication system including a base station, a repeater, and a terminal.
Figure 2:
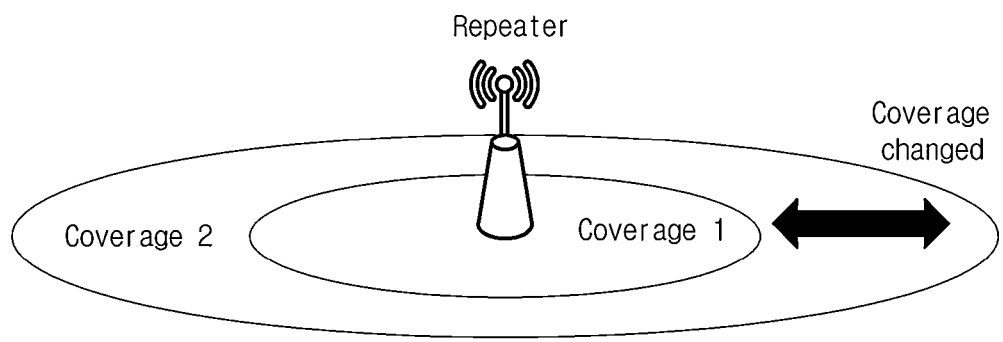
FIG. 2 is a schematic diagram illustrating a change in coverage of a repeater.
Figure 3:
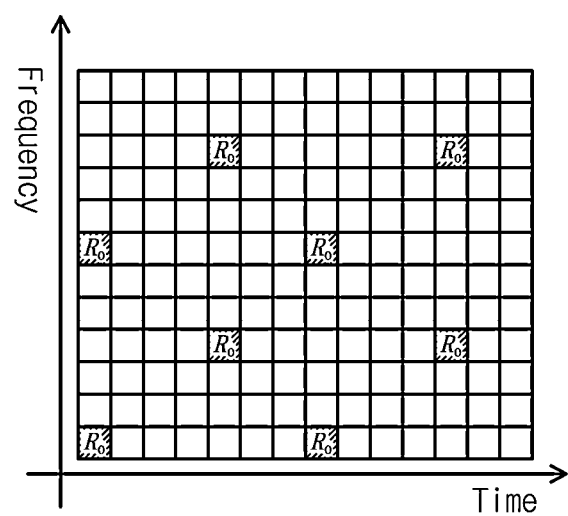
FIG. 3 is a graph illustrating a pilot structure in an OFDM system.
Figure 4:
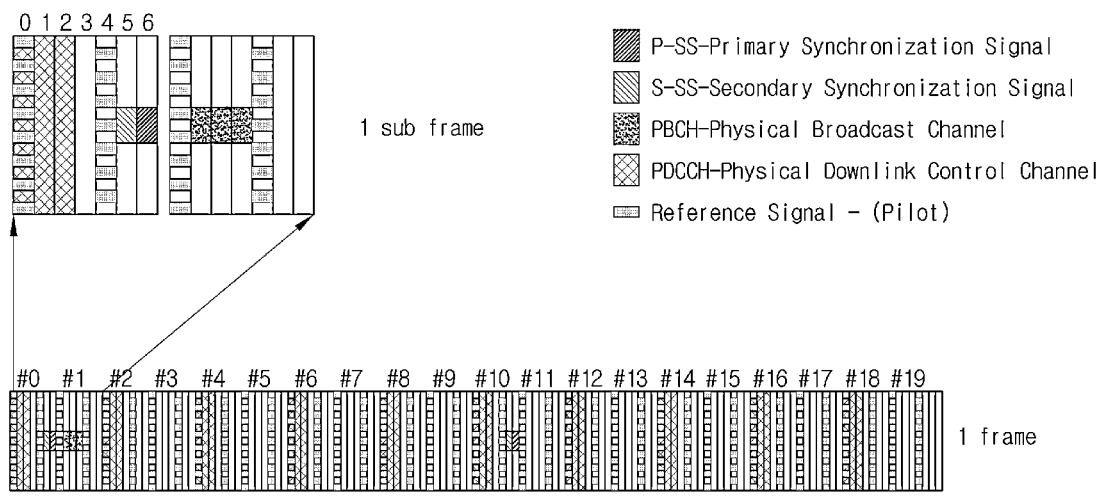
FIG. 4 is a schematic diagram illustrating a frame structure of an LTE system.

FIG. 4 is a schematic diagram illustrating a frame structure of an LTE system.

One frame of the LTE system includes one or more subframes, as illustrated in FIG. 4. Further, the subframe includes at least one of a primary synchronization signal (PSS), a secondary synchronization signal (SSS), a physical broadcast channel (PBCH), a physical downlink control channel (PDCCH), and a reference signal.

The apparatus for regulating transmission power of a repeater according to one embodiment of the present invention regulates the transmission power of the repeater using a signal for which transmission power from a base station is constant, such as a reference signal existing in an LTE signal.

Specifically, the apparatus for regulating transmission power of a repeater according to one embodiment of the present invention regulates the transmission power of the repeater using the PSS or the SSS which repeatedly appears every 5 msec in the frame of the LTE signal.

Next, an apparatus that regulates the transmission power of the repeater according to one embodiment of the present invention will be described with reference to FIGS. 5 and 6.

Figure 5:
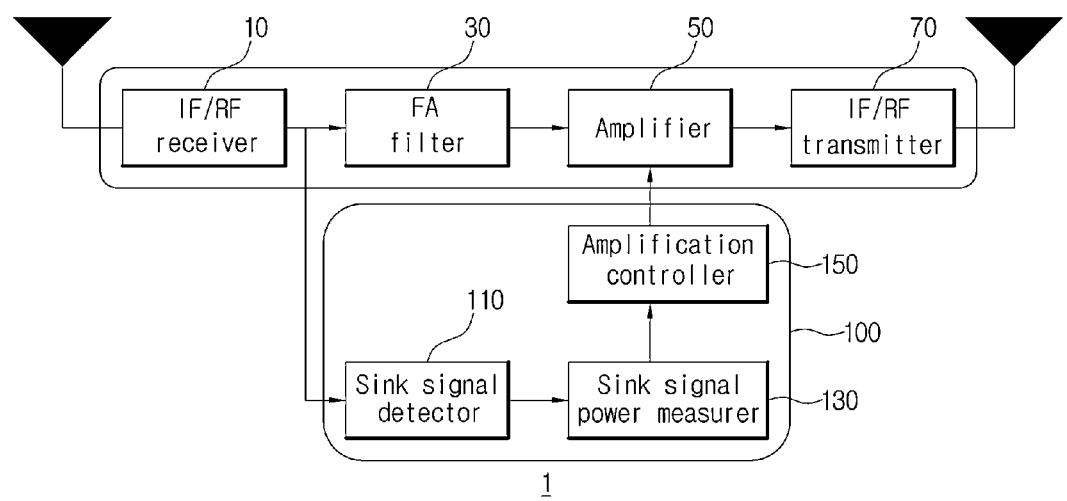
FIG. 5 is a functional block diagram illustrating a repeater including an apparatus for regulating transmission power of the repeater in an LTE system according to one embodiment of the present invention.
Figure 6:
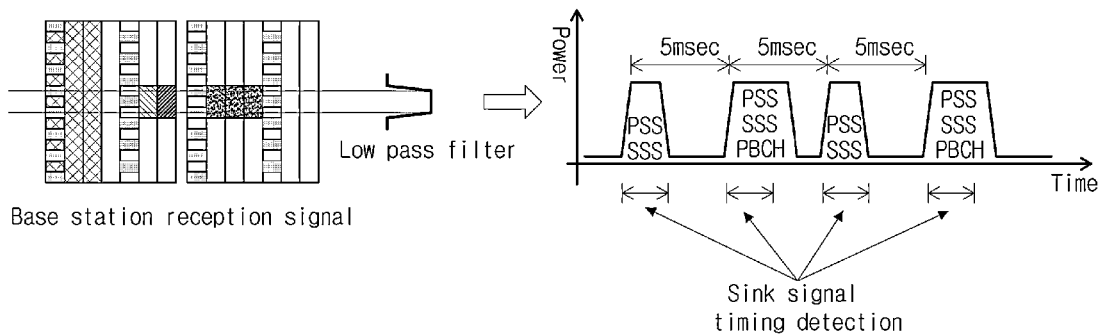
FIG. 6 is a schematic diagram illustrating detection of a timing of a sink signal through a sink signal detector according to one embodiment of the present invention.

FIG. 5 is a functional block diagram illustrating a repeater including an apparatus for regulating transmission power of the repeater in an LTE system according to one embodiment of the present invention, and FIG. 6 is a schematic diagram illustrating detection of a timing of a sink signal through a sink signal detector according to an embodiment of the present invention.

A repeater 1 that receives a signal from a base station and retransmits the signal to a terminal includes an IF/RF receiver 10, an FA filter 30, an amplifier 50, an IF/RF transmitter 70, and an apparatus 100 for regulating the transmission power of the repeater, as illustrated in FIG. 5.

Further, the apparatus 100 for regulating transmission power of a repeater in an LTE system according to one embodiment of the present invention includes a sink signal detector 110, a sink signal power measurer 130, and an amplification controller 150.

The sink signal detector 110 detects a sink signal of a reception signal (an analog signal or a digital signal) received from a base station (not illustrated) through the IF/RF receiver 10 of the repeater 1. Specifically, the sink signal detector 110 may detect the sink signal by causing the reception signal to pass through a low pass filter (LPF) having a predetermined bandwidth. Further, the sink signal may be detected by detecting a timing of the sink signal passing through the low pass filter.

The repeater 1 receives the signal transmitted from the base station via the IF/RF receiver 10, and the received signal is transmitted to the sink signal detector 110. The sink signal detector 110 performs filtering by causing the reception signal to pass through a low pass filter (LPF) having a bandwidth of the sink signal to be detected, as illustrated in FIG. 6.

The signal obtained through the filtering indicates power according to time of the sink signal, as illustrated in FIG. 6. Here, the power of the sink signal according to the time may be the sink signal to be detected.

Further, the sink signal detector 110 may detect a timing of each sink signal. In FIG. 6, the respective sink signals appear at intervals of 5 msec.

Further, the respective sink signals to be detected are the PSS and the SSS described with reference to FIG. 4.

Further, the sink signal detector 110 detects the sink signal by detecting the timing of the sink signal output from the low pass filter. The sink signal detector 110 can detect a desired sink signal only by detecting a rough timing of the sink signal (i.e., roughly estimates the timing of the sink signal).

Further, the sink signal power measurer 130 measures a size of the power of the sink signal detected through the sink signal detector 110. In other words, the sink signal power measurer 130 obtains a moving average and measures average power for a portion corresponding to the timing of the sink signal detected through the sink signal detector 110. A size of the average power measured in this way indicates a size of average power of the signal received through the IF/RF receiver 10 of the repeater 1.

Further, the amplification controller 150 calculates a gain of the amplifier 50 of the repeater 1 for maintaining the constant coverage of the repeater 1 based on the size of the (average) power of the sink signal measured through the sink signal power measurer 130, and controls the amplifier 50 of the repeater 1 according to the calculated gain.

Here, the gain of the amplifier 50 is determined by the following equation.

$$GRepeater = PT/PMA$$

GRepeater: The gain of the amplifier, PT: Target power, and PMA: The average power of the received signal Further, the apparatus 100 for regulating transmission power of a repeater in an LTE system according to one embodiment of the present invention is also applicable to an LTE system that supports a scalable bandwidth.

The LTE system is standardized to be able to support various bandwidths within a standard. However, even in an LTE system having a different signal bandwidth, the sink signal maintains a predetermined bandwidth in the same position. Therefore, the apparatus 100 for regulating transmission power of a repeater according to one embodiment of the present invention can regulate the transmission power of the repeater regardless of the bandwidth of the LTE system.

Figure 7:
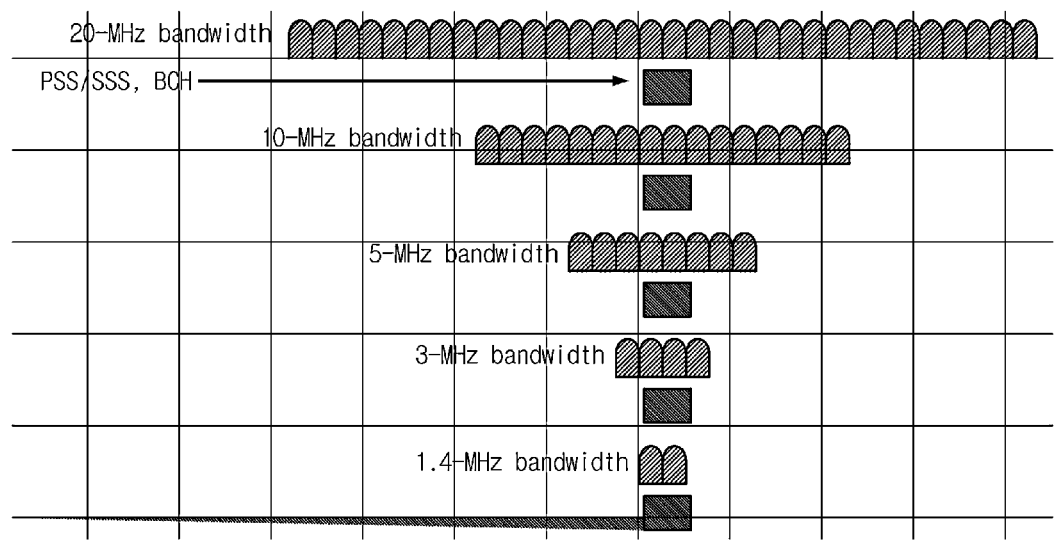
FIG. 7 is a schematic diagram illustrating an LTE system that supports a scalable bandwidth.

The apparatus 100 for regulating transmission power of a repeater using the PSS, the SSS, or the BCH is also applicable to an LTE signal having various bandwidths, as illustrated in FIG. 7. FIG. 7 is a schematic diagram illustrating an LTE system that supports a scalable bandwidth.

Figure 8:
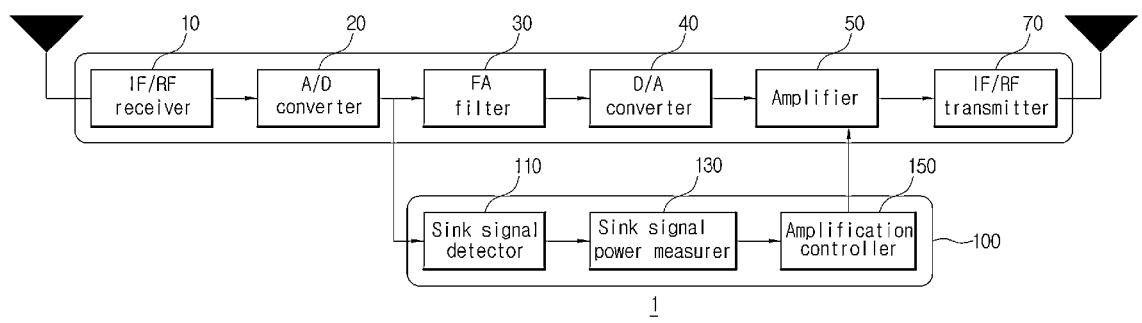
FIG. 8 is a functional block diagram illustrating a repeater including an apparatus for regulating transmission power of the repeater in an LTE system according to another embodiment of the present invention.

Further, the apparatus 100 for regulating transmission power of a repeater according to an embodiment of the present invention is also applicable to a digitally converted signal as illustrated in FIG. 8, unlike that illustrated in FIG. 5.

In other words, a repeater 1 according to another embodiment of the present invention further includes an A/D converter 20 and a D/A converter 40. A signal of a base station received through an IF/RF receiver 10 of the repeater 1 is converted to a digital signal through the A/D converter and then transferred to a sink signal detector 110. FIG. 8 is a functional block diagram illustrating a repeater including an apparatus for regulating transmission power of the repeater in an LTE system according to another embodiment of the present invention.

Finally, an apparatus 100 for regulating transmission power of a repeater according to still another embodiment of the present invention will be described with reference to FIG. 9.

Figure 9:
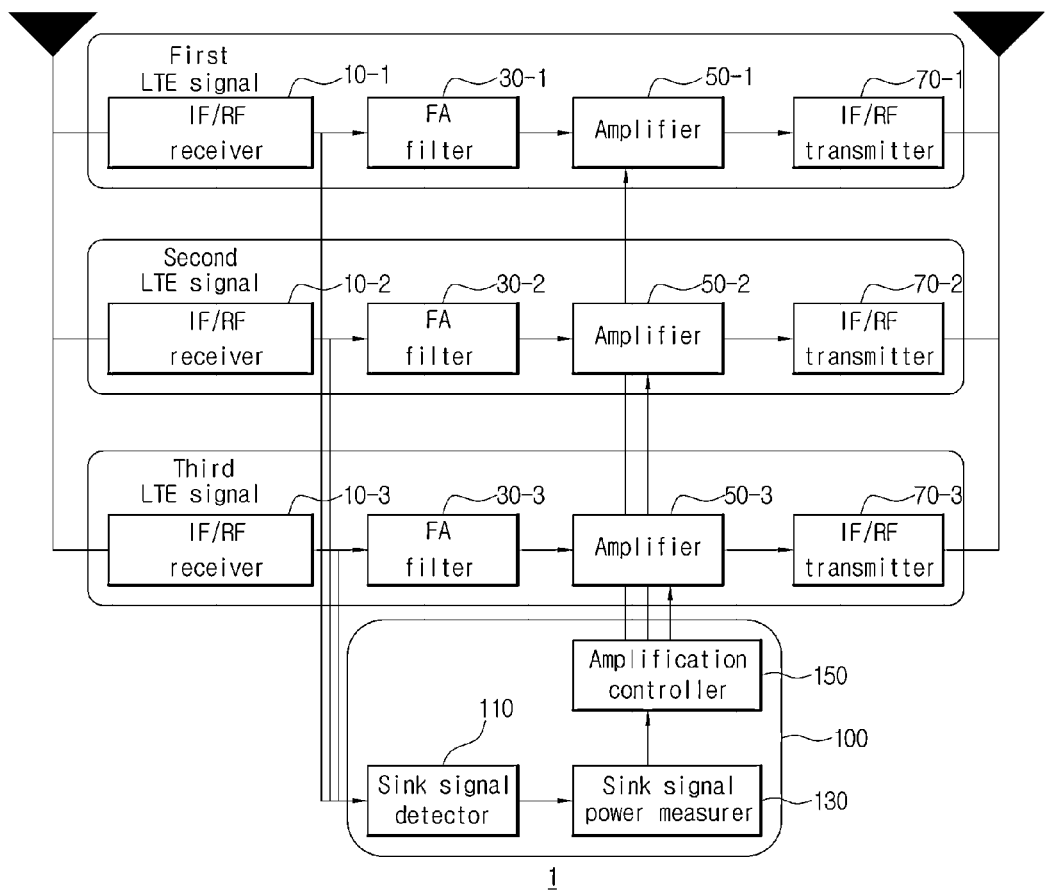
FIG. 9 is a functional block diagram illustrating a repeater including an apparatus for regulating transmission power of the repeater in an LTE system according to still another embodiment of the present invention.

FIG. 9 is a functional block diagram illustrating a repeater including an apparatus for regulating transmission power of the repeater in an LTE system according to still another embodiment of the present invention.

An apparatus 100 for regulating transmission power of a repeater in an LTE system according to still another embodiment of the present invention can detect a sink signal for each of multiple LTE signals adjacent or separate in a frequency domain, measure power, and control a gain of each amplifier. In other words, the apparatus 100 for regulating transmission power of a repeater in an LTE system according to still another embodiment of the present invention can maintain coverage of the repeater 1 in a predetermined range by regulating an independent amplification gain for each of the multiple LTE signals.

The LTE signal includes one or more signals, and the repeater 1 includes one or more IF/RF receivers 10-1, 10-2, and 10-3 that receive one or more LTE signals, FA filters 30-1, 30-2, and 30-3, amplifiers 50-1, 50-2, and 50-3, and IF/RF transmitters 70-1, 70-2, and 70-3, as illustrated in FIG. 9.

Further, a sink signal detector 110 of the apparatus 100 for regulating transmission power of a repeater in an LTE system according to still another embodiment of the present invention receives a signal from each of the one or more IF/RF receivers 10-1, 10-2, and 10-3.

Further, a sink signal power measurer 130 measures a size of power of the sink signal detected through the sink signal detector 110 and transfers the power size to an amplification controller 150.

Further, the amplification controller 150 performs control so that each of the one or more amplifiers 50-1, 50-2, and 50-3 amplifies a signal with a predetermined amplification gain.

The invention claimed is:

1. An apparatus for regulating transmission power of a repeater in an LTE (LONG TERM EVOLUTION) system, the apparatus comprising:
    a sink signal detector that detects a sink signal of a reception signal received through an IF/RF (Intermediate Frequency/Radio Frequency) receiver of the repeater;
    a sink signal power measurer that measures a size of power of the sink signal detected through the sink signal detector; and
    an amplification controller that calculates a gain of an amplifier of the repeater for maintaining coverage of the repeater based on the size of the power of the sink signal measured through the sink signal power measurer, and controls the amplifier of the repeater according to the calculated gain,
    wherein:
        the repeater is provided to be electrically connected to the sink signal detector, the sink signal power measurer, the amplification controller, and the amplifier, and
        the sink signal detector detects the sink signal by causing the reception signal received through the IF/RF receiver to pass through a low pass filter (LPF) having a bandwidth of the sink signal and estimating a timing of the sink signal from the passing signal.

2. The apparatus according to claim 1, wherein:
    the repeater is provided to be electrically connected to the sink signal detector, the sink signal power measurer, the amplification controller, and the amplifier, and
    the sink signal power measurer obtains average power of a timing part of the sink signal passing through the low pass filter (LPF) and calculates a size of the obtained average power as the size of the power of the sink signal.

3. The apparatus according to claim 2, wherein the amplification controller regulates the gain of the amplifier based on the calculated power size (average power) of the sink signal and a predetermined target power determining the coverage of the repeater.

4. The apparatus according to claim 1, wherein:
    the repeater is provided to be electrically connected to the sink signal detector, the sink signal power measurer, the amplification controller, and the amplifier, and
    the sink signal detector detects the sink signal through timing estimation of a primary synchronization signal (PSS) or a secondary synchronization signal (SSS) included in the sink signal.

5. The apparatus according to claim 4, wherein:
the repeater is provided to be electrically connected to the sink signal detector, the sink signal power measurer, the amplification controller, and the amplifier, and
the PSS or the SSS of the sink signal detector repeatedly appears every predetermined time in one frame of an LTE signal that is the reception signal.

6. The apparatus according to claim 5, wherein:
the LTE signal includes one or more signals,
the sink signal detector receives all of respective signals of one or more IF/RF receivers of the repeater included to receive the one or more LTE signals, and
the amplification controller controls respective amplifiers included to correspond to the number of the LTE signals.

7. The apparatus according to claim 1, wherein the reception signal received by the sink signal detector is a signal obtained by converting the reception signal received through the IF/RF receiver of the repeater to a digital signal.

\* \* \* \* \*